F. Landon.

Mower.

No 66
171.

Reissued April 16 1861

Witnesses
S. N. Tyler

Frederick Landon
By O. S. A. Leek
his attorney

UNITED STATES PATENT OFFICE.

BYRON E. HUNTLEY, JOHN M. BOWMAN, CHARLES SILLIMAN, AND LA FAYETTE SILLIMAN, OF BROCKPORT, NEW YORK, ASSIGNEES OF FREDERICK LANDON.

IMPROVEMENT IN HARVESTERS.

Specification forming part of Letters Patent No. 30,655, dated November 13, 1860; Reissue No. 1,171, dated April 16, 1861.

DIVISION A.

*To all whom it may concern:*

Be it known that we, BYRON E. HUNTLEY, JOHN M. BOWMAN, CHARLES SILLIMAN, and LA FAYETTE SILLIMAN, of Brockport, in Monroe county, and State of New York, assignees of the invention of FREDERICK LANDON, of said Brockport, of certain new and useful Improvements in Harvesting-Machines, on which Letters Patent of the United States No. 30,655 were issued to us as such assignees, and dated November 13, 1860, do declare that the following is a full, true, and exact description of the same, reference being had to the accompanying drawings, making a part of this specification.

Figure 1:
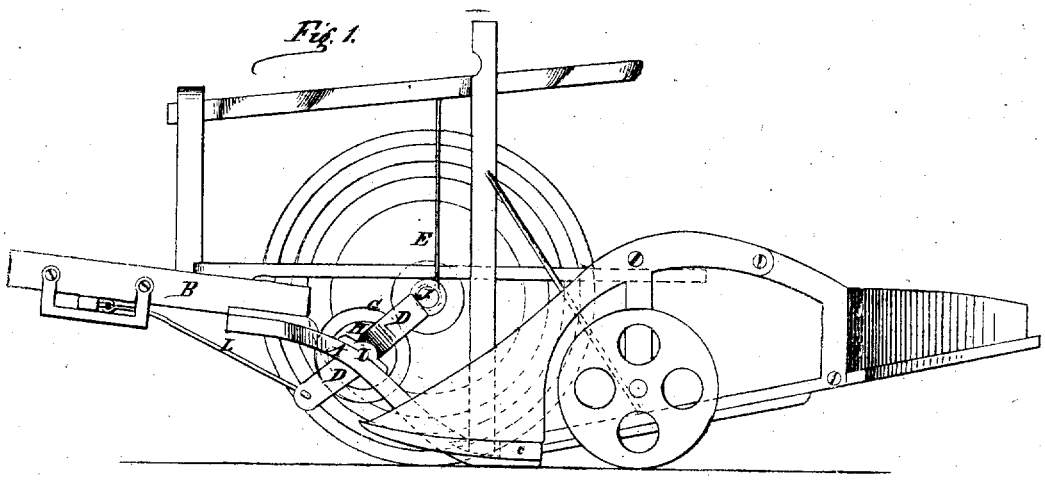
Figure 2:
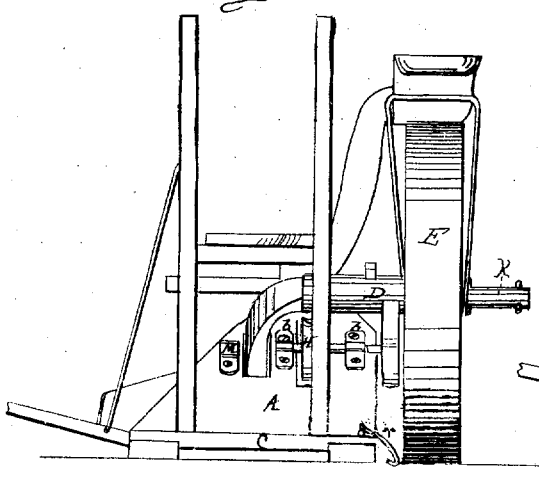
Figure 3:
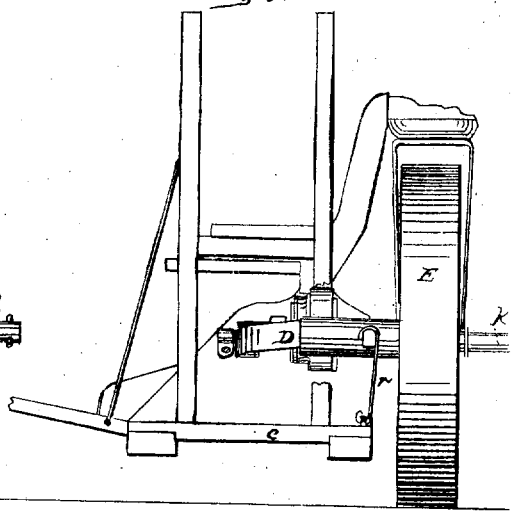

Figure 1 represents a side elevation of a machine containing said improvements. Fig. 2 represents a rear view of a machine containing said improvements when arranged for harvesting grass. Fig. 3 represents a rear view of a machine containing said improvements when arranged for harvesting grain.

It is known by those who use harvesting-machines that their drive wheel or wheels are more likely to slide than to roll in making a descent of any considerable degree of declivity in their path, which sliding motion is caused by the obstruction of the crop being cut to the action of their cutting apparatus.

Efforts have been made to prevent the sliding motion of the drive-wheels of harvesting-machines by casting them heavy, of iron, and by projections on their peripheries; but this increases the weight and draft of the machine to such an extent as to make it constitute a principal part of the weight of the entire machine. It is obvious, if the drive wheel or wheels of harvesting-machines slide while the machine is in progress, that the action of the cutting apparatus is thereby arrested, and that more or less of the crop being cut is left standing.

One object of this invention is to insure a rolling draft of the drive-wheel, and thereby to secure a continuous action of the cutting apparatus of harvesting-machines, under all circumstances, and at the same time to relieve the machine of the weight and resistance of a heavy drive wheel or wheels.

Therefore, to secure the necessary traction of the drive-wheel of harvesters for the purpose stated, the invention claimed in this patent consists in the use of a device which is termed a "traction-lever," connected with the axle of the drive-wheel, and by which the machine is drawn, and which also secures an automatic adjustment of the cutting apparatus to undulations of the earth in its path; but as the latter of these effects forms a part of the subject-matter of another division of this invention, of even date herewith, further remark upon it is omitted here.

That others skilled in the art may make and use this invention, we state the principle of its construction and the manner of its operation.

The general structure of a machine containing this improvement is shown in Fig. 1. The frame is marked A, and may be made of any suitable material. B represents the tongue of the machine, fastened to the front end of the frame. E represents the drive-wheel, which is constructed with an internal spur-wheel to turn a pinion, (not shown in the drawings,) which turns a horizontal transverse pinion-shaft that carries a bevel-wheel that turns a bevel-pinion on a pitman-rod, which through its connections vibrates the cutters of the cutting apparatus. The transverse pinion-shaft revolves in boxes *b b* on the frame A, and the bevel-wheel on it is marked G, and a pulley-wheel on it is marked H. D represents a traction yoke or lever, which is connected at its upper or rearward end with the axle of the drive-wheel, and passes down through the frame, where it is pivoted on the transverse pinion-shaft on one side and on the gudgeon I at the other side, and extends below the frame to the extent of one-third or more of its length, and to its lower ends are attached iron rods of suitable strength for the draft of the machine, which are brought together and carried up under the tongue, when they are turned over in the form of a hook to receive the whiffletrees. They are marked L in the drawings, and are kept in position by iron brackets, as shown in Fig. 1. The machine is drawn from the lower end of the traction-lever. The traction yoke or lever will necessarily be made of iron.

The only connection of the drive-wheel with the machine being through its axle, which passes through and revolves freely in the upper rearward end of the traction-lever, the inner end of which is designated by the letter J in Fig. 1 and by the letter K in Figs. 2 and 3, and the draft of the machine being from the lower end of the traction-lever and against the pinion-shaft and gudgeon as fulcra of the traction-lever, it will be apparent that the power of the team forces the drive-wheel to the earth by a power equal to resistance of the machine and of the crop to the action of the cutting apparatus, which gives it a continuous rolling motion under all circumstances, and thereby insures a continuous action of the cutting apparatus.

It will appear obvious that a traction-lever, connected with the axle of the drive wheel or wheels of harvesting-machines, and from which the machine is drawn, may be pivoted otherwise than as shown in the drawings which accompany this specification, and may be used in machines with frames of different construction and qualities, and it will also appear obvious that as the machine is drawn over undulating ground the traction-lever will occupy different inclinations to the frame of the machine, which will give the drive-wheel a vertical movement independent of a like movement of the frame, and that vertical movements of the frame and cutting apparatus would be independent of similar movement of the drive-wheel, and that in such movements of the respective parts with relation to each other the position of the axle of the drive-wheel will be concentrical to the position of the fulcra of the traction-lever.

Having thus fully stated this invention, what we claim therein as new, and desire to secure by Letters Patent, is—

The use of a traction-lever connected with the axle of the drive wheel or wheels of harvesting-machines in such a manner as that the power of the team in moving the machine forward will insure a rolling motion of the drive wheel or wheels and a continuous action of the cutting apparatus, substantially as described.

BYRON E. HUNTLEY.
JOHN M. BOWMAN.
CHARLES SILLIMAN.
LA FAYETTE SILLIMAN.

Witnesses:
WM. MARTIN,
DANL. HOLMES.